US012693605B2

(12) United States Patent
Yonetoku et al.

(10) Patent No.: US 12,693,605 B2
(45) Date of Patent: Jul. 28, 2026

(54) ELECTROPHOTOGRAPHIC PHOTORECEPTOR, PROCESS CARTRIDGE, AND IMAGE FORMING APPARATUS

(71) Applicant: FUJIFILM Business Innovation Corp., Tokyo (JP)

(72) Inventors: Yuki Yonetoku, Kanagawa (JP); Hideya Katsuhara, Kanagawa (JP); Masaki Hirakata, Kanagawa (JP); Satoshi Mizoguchi, Kanagawa (JP); Takeshi Kawai, Kanagawa (JP); Yukie Hibi, Kanagawa (JP); Jiro Korenaga, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 19/048,964

(22) Filed: Feb. 10, 2025

(65) Prior Publication Data

US 2025/0362625 A1 Nov. 27, 2025

(30) Foreign Application Priority Data

May 27, 2024 (JP) ................................ 2024-085578

(51) Int. Cl.
*G03G 15/00* (2006.01)
*G03G 5/05* (2006.01)
(Continued)

(52) U.S. Cl.
CPC ......... *G03G 5/0696* (2013.01); *G03G 5/0528* (2013.01); *G03G 5/144* (2013.01);
(Continued)

(58) Field of Classification Search
CPC ..... G03G 5/0528; G03G 5/0696; G03G 5/144
(Continued)

(56) References Cited

U.S. PATENT DOCUMENTS 5,298,617 A 3/1994 Nukada et al.
5,378,569 A 1/1995 Nukada et al.
(Continued)

FOREIGN PATENT DOCUMENTS

JP H04189873 7/1992
JP H06313975 11/1994
JP 2007079493 3/2007

OTHER PUBLICATIONS

"Search Report of Europe Counterpart Application", issued on Jul. 22, 2025, pp. 1-7.
(Continued)

*Primary Examiner* — Hoan H Tran
(74) *Attorney, Agent, or Firm* — JCIPRNET

(57) ABSTRACT

An electrophotographic photoreceptor includes a conductive substrate, an undercoat layer that is provided on the conductive substrate and contains zinc oxide particles and a binder resin, a charge generation layer that is provided on the undercoat layer and contains titanium-containing organic pigment and a binder resin, and a charge transport layer that is provided on the charge generation layer, in which a film thickness of the undercoat layer is 15.0 μm or more and 30.0 μm or less, in a case where the film thickness of the undercoat layer is 22.0 μm or more and 30.0 μm or less, each of a proportion of a Ti concentration and a proportion of a Zn concentration with respect to a total of the Ti concentration and the Zn concentration in a region within +500 nm in a film thickness direction from an interface between the undercoat layer and the charge generation layer is 30% or more and 70% or less, and in a case where the film thickness of the undercoat layer is 15.0 μm or more and less than 22.0 μm, each of a proportion of a Ti concentration and a proportion of a Zn concentration with respect to a total of the Ti concentration and the Zn concentration in a region within +500 nm in a film thickness direction from an interface
(Continued)

between the undercoat layer and the charge generation layer is 20% or more and 80% or less.

9 Claims, 2 Drawing Sheets

(51) Int. Cl.
*G03G 5/06* (2006.01)
*G03G 5/14* (2006.01)

(52) U.S. Cl.
CPC ............. *G03G 2215/00957* (2013.01); *G03G 2215/00962* (2013.01); *G03G 2221/183* (2013.01)

(58) Field of Classification Search
USPC .......................................................... 399/159
See application file for complete search history.

(56) References Cited

U.S. PATENT DOCUMENTS

| | | | | |
|---|---|---|---|---|
| 10,712,679 | B1 * | 7/2020 | Kajiwara | G03G 5/142 |
| 2016/0334720 | A1 | 11/2016 | Ishida et al. | |

OTHER PUBLICATIONS

"Office Action of Europe Counterpart Application", issued on Apr. 23, 2026, pp. 1-4.

* cited by examiner

ELECTROPHOTOGRAPHIC PHOTORECEPTOR, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2024-085578 filed May 27, 2024.

BACKGROUND

(i) Technical Field

The present invention relates an electrophotographic photoreceptor, a process cartridge, and an image forming apparatus.

(ii) Related Art

Formation of an image by an electrophotographic method is performed, for example, by charging a surface of a photoreceptor to form an electrostatic charge image on the surface of the photoreceptor according to image information, developing the electrostatic charge image with a developer containing a toner to form a toner image, and transferring and fixing the toner image to a surface of a recording medium.

JP1992-189873A discloses "electrophotographic photoreceptor including, on a support, a photosensitive layer that contains an oxytitanium phthalocyanine hydrate crystal".

SUMMARY

Aspects of non-limiting embodiments of the present disclosure relate to an electrophotographic photoreceptor in which a positive ghost is suppressed as compared with a case where a film thickness of an undercoat layer is less than 15.0 μm or more than 30.0 μm.

Aspects of non-limiting embodiments of the present disclosure relate to an electrophotographic photoreceptor in which a positive ghost is suppressed as compared with a case in which, in a case where a film thickness of an undercoat layer is 22.0 μm or more and 30.0 μm or less, each of a proportion of a Ti concentration described later and a proportion of a Zn concentration described later is less than 30% or more than 70%.

Aspects of non-limiting embodiments of the present disclosure relate to an electrophotographic photoreceptor in which a positive ghost is suppressed as compared with a case in which, in a case where a film thickness of an undercoat layer is 15.0 μm or more and 22.0 μm or less, each of a proportion of a Ti concentration described later and a proportion of a Zn concentration described later is less than 20% or more than 80%.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Methods for achieving the above object include the following.

According to an aspect of the present invention, there is provided an electrophotographic photoreceptor including:

a conductive substrate;

an undercoat layer that is provided on the conductive substrate and contains zinc oxide particles and a binder resin;

a charge generation layer that is provided on the undercoat layer and contains titanium-containing organic pigment and a binder resin; and a charge transport layer that is provided on the charge generation layer, in which a film thickness of the undercoat layer is 15.0 μm or more and 30.0 μm or less, in a case where the film thickness of the undercoat layer is 22.0 μm or more and 30.0 μm or less, each of a proportion of a Ti concentration and a proportion of a Zn concentration with respect to a total of the Ti concentration and the Zn concentration in a region within +500 nm in a film thickness direction from an interface between the undercoat layer and the charge generation layer is 30% or more and 70% or less, and in a case where the film thickness of the undercoat layer is 15.0 μm or more and less than 22.0 μm, each of a proportion of a Ti concentration and a proportion of a Zn concentration with respect to a total of the Ti concentration and the Zn concentration in a region within +500 nm in a film thickness direction from an interface between the undercoat layer and the charge generation layer is 20% or more and 80% or less.

BRIEF DESCRIPTION OF THE DRAWINGS

Exemplary embodiment(s) of the present invention will be described in detail based on the following figures, wherein.

DETAILED DESCRIPTION

Figure 1:
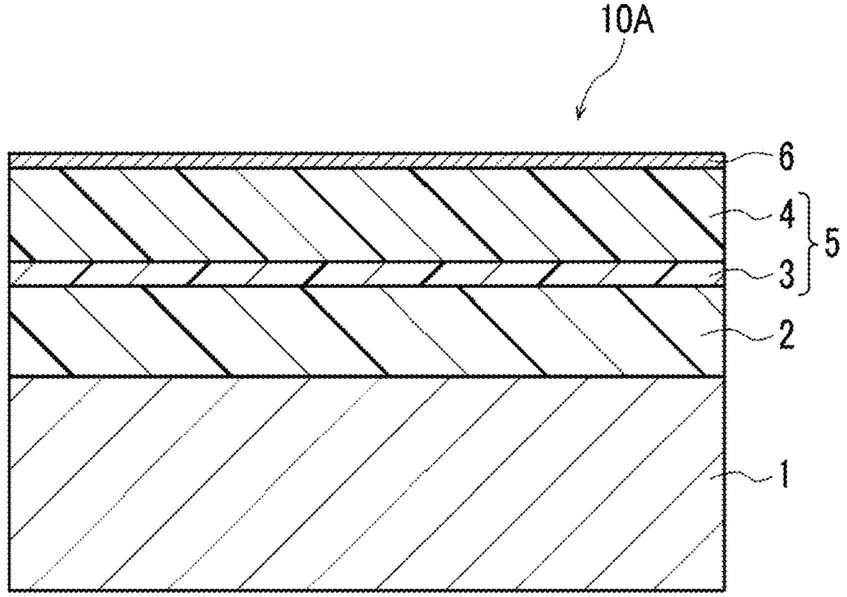
FIG. 1 is a partial cross-sectional view showing an example of a layer configuration of an electrophotographic photoreceptor according to the present exemplary embodiment.

Hereinafter, exemplary embodiments of the present invention will be described in detail with reference to the accompanying drawings. The following descriptions and examples merely illustrate the present invention, and do not limit the present invention.

In the present specification, a numerical range described using "to" represents a range including numerical values listed before and after "to" as the minimum value and the maximum value respectively.

Regarding the numerical ranges described in stages in the present specification, the upper limit or lower limit of a numerical range may be replaced with the upper limit or lower limit of another numerical range described in stages. Furthermore, in the present specification, the upper limit or lower limit of a numerical range may be replaced with values described in examples.

In the present specification, the term "step" includes not only an independent step but a step that is not clearly distinguished from other steps as long as the intended purpose of the step is achieved.

In the present specification, in a case where an exemplary embodiment is described with reference to drawings, the configuration of the exemplary embodiment is not limited to the configuration shown in the drawings. In addition, the sizes of members in each drawing are conceptual and do not limit the relative relationship between the sizes of the members.

In the present specification, each component may include a plurality of corresponding substances. In a case where the amount of each component in a composition is mentioned in the present specification, and there are two or more kinds of substances corresponding to each component in the composition, unless otherwise specified, the amount of each component means the total amount of two or more kinds of the substances present in the composition.

In the present specification, the “electrophotographic photoreceptor” will also be referred to as “photoreceptor”.

Electrophotographic Photoreceptor

The photoreceptor according to the present exemplary embodiment includes a conductive substrate, an undercoat layer that is provided on the conductive substrate and contains zinc oxide particles and a binder resin, a charge generation layer that is provided on the undercoat layer and contains titanium-containing organic pigment and a binder resin, and a charge transport layer that is provided on the charge generation layer.

In a case where a film thickness of the undercoat layer is 22.0 μm or more and 30.0 μm or less, each of a proportion of a Ti concentration and a proportion of a Zn concentration with respect to the total of the Ti concentration and the Zn concentration in a region within +500 nm in a film thickness direction from an interface between the undercoat layer and the charge generation layer is 30% or more and 70% or less.

In a case where a film thickness of the undercoat layer is 15.0 μm or more and less than 22.0 μm, each of a proportion of a Ti concentration and a proportion of a Zn concentration with respect to the total of the Ti concentration and the Zn concentration in a region within +500 nm in a film thickness direction from an interface between the undercoat layer and the charge generation layer is 20% or more and 80% or less.

Due to the above-described configuration, the photoreceptor according to the present exemplary embodiment suppresses occurrence of a positive ghost. The reason is presumed as follows.

In a photoreceptor having a conductive substrate, an undercoat layer containing zinc oxide particles and a binder resin, a charge generation layer containing a titanium-containing organic pigment and a binder resin, and a charge transport layer, an energy gap at an interface between the undercoat layer and the charge generation layer is large. As a result, movement and injection of charges are inhibited, and thus dark decay is likely to occur. In a case where the dark decay occurs, a surface potential in an image area of a previous image forming cycle is partially decreased in the surface of the electrophotographic photoreceptor, and potential fluctuation occurs in the subsequent image forming cycle. Therefore, a phenomenon called a positive ghost occurs in which a region (that is, the image area of the previous image forming cycle) where the surface potential is partially decreased is prominently highlighted in the subsequent image forming cycle.

On the other hand, in the photoreceptor according to the present exemplary embodiment, the proportion of the Ti concentration and the proportion of the Zn concentration in the region within ±500 nm in the film thickness direction from the interface between the undercoat layer and the charge generation layer are set to be in the above-described range. The concentrations of Ti and Zn approach uniformity near the interface between the undercoat layer and the charge generation layer. That is, dispersibility of the zinc oxide particles and the titanium-containing organic pigment approaches a state close to uniform. As a result, the energy gap at the interface between the undercoat layer and the charge generation layer is reduced. Therefore, the inhibition of the movement and injection of charges is suppressed, and the dark decay is less likely to occur. As a result, the potential fluctuation is less likely to occur, and the positive ghost is suppressed.

In addition, in a case where the film thickness of the undercoat layer is reduced, a film resistance of the undercoat layer is reduced. Therefore, in a case where the film thickness of the undercoat layer is small, even though the concentration ratio of Ti and Zn is large, that is, even though the dispersibility of the zinc oxide particles and the titanium-containing organic pigment is low, the inhibition of the movement and injection of charges is suppressed, and the dark decay is less likely to occur, as compared with a case where the film thickness of the undercoat layer is large. As a result, the potential fluctuation is less likely to occur, and the positive ghost is suppressed.

From the above, it is presumed that the positive ghost is suppressed in the photoreceptor according to the present exemplary embodiment.

Here, in an image forming apparatus including a direct current charging device and not including a static current charging device that eliminates static electricity of the photoreceptor before charging the photoreceptor after toner transfer, the positive ghost is likely to occur. However, even in a case where the photoreceptor according to the present exemplary embodiment is applied to such an image forming apparatus, the positive ghost is suppressed.

Hereinafter, the photoreceptor according to the present exemplary embodiment will be described in detail.

FIG. 1 is a partial cross-sectional view showing an example of a layer configuration of the photoreceptor according to the present exemplary embodiment. A photoreceptor 10A shown in FIG. 1 includes a lamination-type photosensitive layer. The photoreceptor 10A has a structure in which an undercoat layer 2, a charge generation layer 3, a charge transport layer 4, and a protective layer 6 are laminated in this order on a conductive substrate 1, and the charge generation layer 3 and the charge transport layer 4 constitute a photosensitive layer 5 (so-called function separation-type photosensitive layer). The protective layer 6 may or may not be provided.

Hereinafter, each layer of the photosensitive layer according to the present exemplary embodiment will be described in detail. However, reference numerals are omitted.

Film Thickness of Undercoat Layer

The film thickness of the undercoat layer is 15.0 μm or more and 30.0 μm or less, and is, for example, preferably 15.0 μm or more and 25.0 μm or less.

In a case where the film thickness of the undercoat layer is less than 15.0 μm, current leakage during charging and current leakage due to sticking of needle-like foreign matter occur, and thus the function as the photoreceptor is not exhibited.

In a case where the film thickness of the undercoat layer is more than 30.0 μm, potential maintainability is lowered due to the increase in resistance. Therefore, the positive ghost occurs.

Accordingly, the film thickness of the undercoat layer is set to be within the above-described range.

The film thickness of the undercoat layer is measured as follows.

First, a central portion of the photoreceptor in the axial direction is cut out to obtain a sample. Next, an observation image of a cross section of the sample is obtained with a scanning electron microscope (SEM). Next, in the observation image, film thicknesses of the undercoat layer and the charge transport layer are each measured at 10 points, and an arithmetic average value thereof is obtained.

Proportions of Ti Concentration and Zn Concentration at Interface between Undercoat Layer and Charge Generation Layer In a case where the film thickness of the undercoat layer is 22.0 μm or more and 30.0 μm or less, each of the proportion of the Ti concentration and the proportion of the Zn concentration with respect to the total of the Ti concentration and the Zn concentration in the region within +500 nm in the film thickness direction from the interface between the undercoat layer and the charge generation layer is 30% or more and 70% or less, for example, preferably 40% or more and 60% or less.

That is, the concentration ratio (Ti/Zn) of Ti to Zn in the region is 30/70 or more and 70/30 or less, and is, for example, preferably 40/60 or more and 60/40 or less.

In a case where the film thickness of the undercoat layer is 15.0 μm or more and less than 22.0 μm, each of the proportion of the Ti concentration and the proportion of the Zn concentration with respect to the total of the Ti concentration and the Zn concentration in the region within +500 nm in the film thickness direction from the interface between the undercoat layer and the charge generation layer is 20% or more and 80% or less, for example, preferably 30% or more and 70% or less, and more preferably 40% or more and 60% or less.

That is, the concentration ratio (Ti/Zn) of Ti to Zn in the region is 20/80 or more and 80/20 or less, and is, for example, preferably 30/70 or more and 70/30 or less, and more preferably 40/60 or more and 60/40 or less.

In a case where the proportion of the Ti concentration and the proportion of the Zn concentration deviate from the above-described ranges, the dispersibility of the zinc oxide particles and the titanium-containing organic pigment is low. As a result, the energy gap at the interface between the undercoat layer and the charge generation layer is increased. Therefore, the movement and injection of charge are likely to be inhibited, and the dark decay occurs. Accordingly, the potential fluctuation occurs, and thus the positive ghost occurs.

In particular, from the viewpoint of suppressing the positive ghost, for example, it is preferable that the film thickness of the undercoat layer is 15.0 μm or more and 25.0 μm or less, each of the proportion of the Ti concentration and the proportion of the Zn concentration with respect to the total of the Ti concentration and the Zn concentration in the region within +500 nm in the film thickness direction from the interface between the undercoat layer and the charge generation layer is 40% or more and 60% or less.

Examples of a method of setting the proportion of the Ti concentration and the proportion of the Zn concentration within the above-described ranges include a method of reducing a circulation flow rate of a coating solution in a case of forming the undercoat layer by dip coating using a coating solution circulation method. It is assumed that surface properties of the undercoat layer are changed in a case where the circulation flow rate of the coating solution is decreased. As a result, a contact area between the undercoat layer and the charge transport layer increases, and the tendency to be uniformly mixed tends to bring the ratio of the Ti concentration and the Zn concentration close to 50%: 50%. In a case where the circulation flow rate is increased, the proportion of the Zn concentration tends to increase; and in a case where the circulation flow rate is decreased, the proportion of the Zn concentration tends to increase. From the tendency, it is considered that the proportion of the Ti concentration and the proportion of the Zn concentration can be adjusted to the above-described ranges.

A method of measuring the proportion of the Ti concentration and the proportion of the Zn concentration is as follows.

First, a sample is collected from the photoreceptor to be measured.

Surface polishing is carried out on the sample to remove the charge transport layer as much as possible.

Next, at the surface of the charge generation layer, the sample is subjected to elemental analysis by X-ray photoelectron spectroscopy (XPS) under the following analysis conditions, and a Ti concentration (atomic %) and a Zn concentration (atomic %) are obtained from peak intensities of Ti and Zn. Elements to be analyzed are Ti, Zn, C, O, N, and Si.

However, the measurement of both the Ti concentration and the Zn concentration is started after ion etching is performed until the peak of Ti is detected.

XPS Analysis Conditions

Device name: JPS-9030 (XPS manufactured by JEOL Ltd.)

X-ray type: MgKα

Acceleration voltage: 10 kV

Emission current: 10 mA

Measurement step: 0.1 eV

Pass energy: 10 eV

Dwell Time: 100 to 500 ms

The above-described element analysis operation is carried out from the surface of the charge generation layer to the undercoat layer while performing ion etching under the following conditions until the Zn concentration is saturated.

Etching Conditions

Etching gas: argon

Ion gun acceleration voltage: 500 V

Etching time: the first etching on the surface of the charge generation layer at the start of the measurement is set to 40 seconds, and the subsequent etchings are set to 60 seconds The above-described operation is carried out to obtain a profile of the Ti concentration and a profile of the Zn concentration in the film thickness direction of the undercoat layer and the charge generation layer.

A region within ±500 nm in the film thickness direction from the interface between the undercoat layer and the charge generation layer is specified from the profile of the Ti concentration and the profile of the Zn concentration. A cumulative value of the Ti concentration and the Zn concentration in the specified region is obtained.

Here, the interface between the undercoat layer and the charge generation layer is a portion where the Zn concentration is ½ of a saturation value.

The proportion of the Ti concentration and the proportion of the Zn concentration are calculated by the following expression.

Proportion of Ti concentration = Cumulative value of Ti concentration/(Cumulative value of Ti concentration + Cumulative value of Zn concentration) × 100    Expression Proportion of Zn concentration = Cumulative value of Zn concentration/(Cumulative value of Ti concentration + Cumulative value of Zn concentration) × 100    Expression Conductive Substrate Examples of the conductive substrate include metal plates, metal drums, metal belts, or the like, containing a metal (such as aluminum, copper, zinc, chromium, nickel, molybdenum, vanadium, indium, gold, and platinum) or an alloy (such as stainless steel). In addition, examples of the conductive substrate also include paper, a resin film, a belt, or the like, that is obtained by being coated, vapor-deposited, or laminated with a conductive compound (such as a conductive polymer and indium oxide), a metal (such as aluminum, palladium, and gold) or an alloy. Here, the term "conductive" denotes that a volume resistivity is less than $10^{13}\Omega\cdot$cm.

In a case where the electrophotographic photoreceptor is used in a laser printer, for example, it is preferable that a surface of the conductive substrate is roughened such that a centerline average roughness Ra thereof is 0.04 μm or more and 0.5 μm or less for the purpose of suppressing interference fringes from occurring in a case of irradiation with laser beams. In a case where incoherent light is used as a light source, roughening of the surface to prevent the interference fringes is not particularly necessary, and it is appropriate for longer life because occurrence of defects due to the roughness of the surface of the conductive substrate is suppressed.

Examples of the roughening method include wet honing performed by suspending an abrasive in water and spraying the suspension to the conductive substrate, centerless grinding performed by pressure-welding the conductive substrate against a rotating grindstone and continuously grinding the conductive substrate, and an anodizing treatment.

Examples of the roughening method also include a method of dispersing conductive or semi-conductive powder in a resin without roughening the surface of the conductive substrate to form a layer on the surface of the conductive substrate, and performing roughening using the particles dispersed in the layer.

The roughening treatment by anodization is a treatment of forming an oxide film on the surface of the conductive substrate by carrying out anodization in an electrolytic solution using a conductive substrate made of a metal (for example, aluminum) as an anode. Examples of the electrolytic solution include a sulfuric acid solution and an oxalic acid solution. However, a porous anodized film formed by the anodization is chemically active in a natural state, is easily contaminated, and has a large resistance fluctuation depending on the environment. Therefore, for example, it is preferable that a sealing treatment is performed on the porous anodized film so that micropores of the oxide film are closed by volume expansion due to a hydration reaction in pressurized steam or boiling water (a metal salt such as nickel may be added thereto) for a change into a more stable a hydrous oxide.

A film thickness of the anodized film is, for example, preferably 0.3 μm or more and 15 μm or less. In a case where the film thickness is within the above-described range, barrier properties against injection tend to be exhibited, and an increase in the residual potential due to repeated use tends to be suppressed.

The conductive substrate may be subjected to a treatment with an acidic treatment liquid or a boehmite treatment.

The treatment with an acidic treatment liquid is carried out, for example, as follows. First, an acidic treatment liquid containing phosphoric acid, chromic acid, and hydrofluoric acid is prepared. As a blending proportion of the phosphoric acid, chromic acid, and hydrofluoric acid to the acidic treatment liquid, for example, a concentration of the phosphoric acid may be in a range of 10% by mass or more and 11% by mass or less, a concentration of the chromic acid may be in a range of 3% by mass or more and 5% by mass or less, and a concentration of the hydrofluoric acid may be in a range of 0.5% by mass or more and 2% by mass or less, and a concentration of all of these acids may be in a range of 13.5% by mass or more and 18% by mass or less. A treatment temperature is, for example, preferably 42° C. or higher and 48° C. or lower. A film thickness of the coating film is, for example, preferably 0.3 μm or more and 15 μm or less.

The boehmite treatment is carried out, for example, by dipping the base material in pure water at 90° C. or higher and 100° C. or lower for 5 minutes to 60 minutes, or by bringing the base material into contact with heated steam at 90° C. or higher and 120° C. or lower for 5 minutes to 60 minutes. A film thickness of the coating film is, for example, preferably 0.1 μm or more and 5 μm or less. The coating film may be further subjected to an anodizing treatment using an electrolytic solution having low film solubility, such as adipic acid, boric acid, a borate, a phosphate, a phthalate, a maleate, a benzoate, a tartrate, or a citrate.

Undercoat Layer

The undercoat layer is a layer containing zinc oxide particles and a binder resin.

A volume-average particle diameter of the zinc oxide particles may be 50 nm or more and 2,000 nm or less (for example, preferably 60 nm or more and 1,000 nm or less).

The volume-average particle diameter of the zinc oxide particles is measured by separating the zinc oxide particles from the layer, observing 100 primary particles of the obtained zinc oxide particles with a scanning electron microscope (SEM) device at a magnification of 40,000 times, measuring the longest diameter and the shortest diameter of each particle by image analysis of the primary particles, and measuring an equivalent circle diameter from the intermediate value. A 50% diameter (D50v) of the obtained equivalent circle diameter in the volume-based cumulative frequency is obtained. The obtained 50% diameter (D50v) is defined as the volume-average particle diameter of the zinc oxide particles.

A specific surface area of the zinc oxide particles, measured by a BET method, may be, for example, 10 $m^2/g$ or more.

A content of the zinc oxide particles is, for example, preferably 10% by mass or more and 80% by mass or less, and more preferably 40% by mass or more and 80% by mass or less with respect to the binder resin.

Other inorganic particles may be used in combination with the zinc oxide particles. However, a proportion of the zinc oxide particles in all inorganic particles is, for example, preferably 90% by mass or more and preferably 95% by mass or more.

Examples of the other inorganic particles include inorganic particles having a powder resistance (volume resistivity) of $10^2\Omega\cdot cm$ or more and $10^{11}\Omega\cdot cm$ or less.

Examples of the other inorganic particles include metal oxide particles such as tin oxide particles, titanium oxide particles, and zirconium oxide particles.

The inorganic particles including the zinc oxide particles may be subjected to a surface treatment. As the inorganic particles, two or more kinds of inorganic particles subjected to different surface treatments or two or more kinds of inorganic particles having different particle diameters may be used in a form of a mixture.

Examples of a surface treatment agent include a silane coupling agent, a titanate-based coupling agent, an aluminum-based coupling agent, and a surfactant. In particular, for example, a silane coupling agent is preferable, and a silane coupling agent having an amino group is more preferable.

Examples of the silane coupling agent having an amino group include 3-aminopropyltriethoxysilane, N-2-(aminoethyl)-3-aminopropyltrimethoxysilane, N-2-(aminoethyl)-3-aminopropylmethyldimethoxysilane, and N,N-bis(2-hydroxyethyl)-3-aminopropyltriethoxysilane; but the present invention is not limited thereto.

The silane coupling agent may be used in a form of a mixture of two or more kinds thereof. For example, the silane coupling agent having an amino group and other silane coupling agents may be used in combination. Examples of the other silane coupling agents include vinyltrimethoxysilane, 3-methacryloxypropyl-tris(2-methoxyethoxy) silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane; but the present invention is not limited thereto.

A surface treatment method using the surface treatment agent may be any method as long as the method is a known method, and any of a dry method or a wet method may be used.

A treatment amount of the surface treatment agent is, for example, preferably 0.5% by mass or more and 10% by mass or less with respect to the inorganic particles.

Here, for example, the undercoat layer may contain an electron-accepting compound (acceptor compound) together with the inorganic particles from the viewpoint of enhancing long-term stability of electrical properties and carrier blocking properties.

Examples of the electron-accepting compound include electron-transporting substances, for example, a compound having an anthraquinone structure; a quinone-based compound such as chloranil and bromanil; a tetracyanoquinodimethane-based compound; a fluorenone compound such as 2,4,7-trinitrofluorenone and 2,4,5,7-tetranitro-9-fluorenone; an oxadiazole-based compound such as 2-(4-biphenyl)-5-(4-t-butylphenyl)-1,3,4-oxadiazole, 2,5-bis(4-naphthyl)-1,3,4-oxadiazole, and 2,5-bis(4-diethylaminophenyl)-1,3,4-oxadiazole; a xanthone-based compound; a thiophene compound; a diphenoquinone compound such as 3,3',5,5'-tetra-t-butyldiphenoquinone; and a benzophenone compound.

In particular, as the electron-accepting compound, for example, a compound having an anthraquinone structure is preferable. As the compound having an anthraquinone structure, for example, a hydroxyanthraquinone compound, an aminoanthraquinone compound, or an aminohydroxyanthraquinone compound is preferable; and specifically, anthraquinone, alizarin, quinizarin, anthrarufin, purpurin, or a derivative thereof is preferable.

The electron-accepting compound may be contained in the undercoat layer in a state of being dispersed with the inorganic particles, or in a state of being attached to the surface of the inorganic particles.

Examples of a method of attaching the electron-accepting compound to the surface of the inorganic particles include a dry method and a wet method.

The dry method is, for example, a method of attaching the electron-accepting compound to the surface of the inorganic particles by adding the electron-accepting compound dropwise to the inorganic particles directly or by dissolving the electron-accepting compound in an organic solvent while stirring the inorganic particles with a mixer having a large shearing force and spraying the mixture together with dry air or nitrogen gas. For example, the dropwise addition or spraying of the electron-accepting compound may be performed at a temperature equal to or lower than a boiling point of the solvent. After the dropwise addition or spraying of the electron-accepting compound, the mixture may be further baked at 100° C. or higher. The baking is not particularly limited as long as the temperature and the time are adjusted such that electrophotographic characteristics can be obtained.

The wet method is, for example, a method of attaching the electron-accepting compound to the surface of the inorganic particles by adding the electron-accepting compound to inorganic particles while dispersing the inorganic particles in a solvent by performing using a stirrer, an ultrasonic disperser, a sand mill, an attritor, or a ball mill, stirring or dispersing the mixture, and removing the solvent. The solvent removing method is carried out by, for example, filtration or distillation so that the solvent is distilled off. After removal of the solvent, the mixture may be further baked at 100° C. or higher. The baking is not particularly limited as long as the temperature and the time are adjusted such that electrophotographic characteristics can be obtained. In the wet method, the moisture contained in the inorganic particles may be removed before the electron-accepting compound is added, and examples thereof include a method of removing the moisture while stirring and heating the inorganic particles in a solvent and a method of removing the moisture by azeotropically boiling the inorganic particles with a solvent.

The electron-accepting compound may be attached before or after the inorganic particles are subjected to the surface treatment with the surface treatment agent or simultaneously with the surface treatment with the surface treatment agent.

A content of the electron-accepting compound may be, for example, 0.01% by mass or more and 20% by mass or less, preferably 0.01% by mass or more and 10% by mass or less with respect to the inorganic particles.

Examples of the binder resin used for the undercoat layer include a known polymer compound such as an acetal resin (such as polyvinyl butyral), a polyvinyl alcohol resin, a polyvinyl acetal resin, a casein resin, a polyamide resin, a cellulose resin, gelatin, a polyurethane resin, a polyester resin, an unsaturated polyester resin, a methacrylic resin, an acrylic resin, a polyvinyl chloride resin, a polyvinyl acetate resin, a vinyl chloride-vinyl acetate-maleic anhydride resin, a silicone resin, a silicone-alkyd resin, a urea resin, a phenol resin, a phenol-formaldehyde resin, a melamine resin, a urethane resin, an alkyd resin, and an epoxy resin; a zirconium chelate compound; a titanium chelate compound; an aluminum chelate compound; a titanium alkoxide compound; an organic titanium compound; and a known material such as a silane coupling agent.

Examples of the binder resin used for the undercoat layer also include a charge-transporting resin having a charge-transporting group, and a conductive resin (for example, polyaniline or the like).

Among the above, as the binder resin used for the undercoat layer, for example, a resin insoluble in a coating solvent of an upper layer is suitable; and a resin obtained by a reaction between at least one resin selected from the group consisting of a thermosetting resin such as a urea resin, a phenol resin, a phenol-formaldehyde resin, a melamine resin, a urethane resin, an unsaturated polyester resin, an alkyd resin, or an epoxy resin; a polyamide resin, a polyester resin, a polyether resin, a methacrylic resin, an acrylic resin, a polyvinyl alcohol resin, and a polyvinyl acetal resin, and a curing agent is particularly suitable.

In a case where these binder resins are used in combination of two or more kinds thereof, a mixing proportion thereof is set as necessary.

The undercoat layer may contain various additives for improving the electrical properties, the environmental stability, and the image quality.

Examples of the additive include known materials, for example, an electron-transporting pigment such as a polycyclic condensed pigment or an azo-based pigment, a zirconium chelate compound, a titanium chelate compound, an aluminum chelate compound, a titanium alkoxide compound, an organic titanium compound, and a silane coupling agent. The silane coupling agent is used for the surface treatment of the inorganic particles as described above, but may be further added to the undercoat layer as the additive.

Examples of the silane coupling agent as the additive include vinyltrimethoxysilane, 3-methacryloxypropyl-tris (2-methoxyethoxy) silane, 2-(3,4-epoxycyclohexyl)ethyltrimethoxysilane, 3-glycidoxypropyltrimethoxysilane, vinyltriacetoxysilane, 3-mercaptopropyltrimethoxysilane, 3-aminopropyltriethoxysilane, N-2-(aminoethyl)-3-aminopropyltrimethoxysilane, N-2-(aminoethyl)-3-aminopropylmethyldimethoxysilane, N,N-bis(2-hydroxyethyl)-3-aminopropyltriethoxysilane, and 3-chloropropyltrimethoxysilane.

Examples of the zirconium chelate compound include zirconium butoxide, ethyl zirconium acetoacetate, zirconium triethanolamine, acetylacetonate zirconium butoxide, ethyl zirconium butoxide acetoacetate, zirconium acetate, zirconium oxalate, zirconium lactate, zirconium phosphonate, zirconium octanoate, zirconium naphthenate, zirconium laurate, zirconium stearate, zirconium isostearate, zirconium butoxide methacrylate, stearate zirconium butoxide, and isostearate zirconium butoxide.

Examples of the titanium chelate compound include tetraisopropyl titanate, tetranormal butyl titanate, a butyl titanate dimer, tetra(2-ethylhexyl) titanate, titanium acetylacetonate, polytitanium acetylacetonate, titanium octylene glycolate, titanium lactate ammonium salt, titanium lactate, titanium lactate ethyl ester, titanium triethanol aminate, and polyhydroxy titanium stearate.

Examples of the aluminum chelate compound include aluminum isopropylate, monobutoxyaluminum diisopropylate, aluminum butyrate, diethylacetoacetate aluminum diisopropylate, and aluminum tris(ethylacetoacetate).

These additives may be used alone or in a form of a mixture or a polycondensate of a plurality of compounds.

The undercoat layer may have, for example, a Vickers hardness of 35 or more.

For example, the surface roughness (ten-point average roughness) of the undercoat layer may be adjusted to ½ from 1/(4n) (n represents a refractive index of an upper layer) of a laser wavelength λ for exposure to be used to suppress moire fringes.

Resin particles or the like may be added to the undercoat layer to adjust the surface roughness. Examples of the resin particles include silicone resin particles and crosslinked polymethyl methacrylate resin particles. In addition, the surface of the undercoat layer may be polished to adjust the surface roughness. Examples of a polishing method include buff polishing, a sandblast treatment, wet honing, and a grinding treatment.

The formation of the undercoat layer is not particularly limited, and a known forming method is used. For example, a coating film of a coating solution for forming the undercoat layer, in which the above-described components are added to a solvent, is formed, and the coating film is dried and then heated as necessary.

Examples of the solvent for preparing the coating solution for forming the undercoat layer include known organic solvents such as an alcohol-based solvent, an aromatic hydrocarbon solvent, a halogenated hydrocarbon solvent, a ketone-based solvent, a ketone alcohol-based solvent, an ether-based solvent, and an ester-based solvent.

Specific examples of the solvent include typical organic solvents such as methanol, ethanol, n-propanol, iso-propanol, n-butanol, benzyl alcohol, methyl cellosolve, ethyl cellosolve, acetone, methyl ethyl ketone, cyclohexanone, methyl acetate, ethyl acetate, n-butyl acetate, dioxane, tetrahydrofuran, methylene chloride, chloroform, chlorobenzene, and toluene.

Examples of the method of dispersing the inorganic particles in a case of preparing the coating solution for forming the undercoat layer include known methods such as a roll mill, a ball mill, a vibration ball mill, an attritor, a sand mill, a colloid mill, and a paint shaker.

Examples of the method of coating the conductive substrate with the coating solution for forming the undercoat layer include typical coating methods such as a blade coating method, a wire bar coating method, a spray coating method, a dip coating method, a bead coating method, an air knife coating method, and a curtain coating method.

Charge Generation Layer

The charge generation layer is a layer containing a titanium-containing organic pigment and a binder resin.

Examples of the titanium-containing organic pigment include titanyl phthalocyanine.

Examples of oxytitanium phthalocyanine include known crystal types of oxytitanium phthalocyanine, such as an α type, a β type, a C type, a D type, a Y type, an M type, an M-α type, and an I type.

Among the above, from the viewpoint of high sensitivity, the oxytitanium phthalocyanine is, for example, preferably a Y-type or D-type oxytitanium phthalocyanine that exhibits a maximum diffraction peak at a Bragg angle (2θ+) 0.2° of 27.3° in a powder X-ray diffraction spectrum obtained by CuKα characteristic X-rays.

θ is an angle formed by a crystal lattice plane and an incident wave.

The titanyl phthalocyanine is, for example, preferably a hydrated crystal having a molecular formula of $TiPc(H_2O)_n$ (in the formula, Pc represents a phthalocyanine residue and n represents 0.15 to 1) after being dried under reduced pressure at 100° C. and 0.1 mmHg and then left to stand in an air atmosphere at room temperature (25° C.) and normal pressure (1 atm) for 12 hours. Specifically, the titanyl phthalocyanine is, for example, preferably an oxytitanium phthalocyanine hydrate crystal described in JP1992-189873A.

For example, in a case where the above-described hydrated crystal is applied as the titanyl phthalocyanine, the photosensitivity is improved, that is preferable.

Other charge generation materials may be used in combination with the titanium-containing organic pigment. However, a proportion of the titanium-containing organic pigment in the total charge generation material is, for example, preferably 90% by mass or more, and more preferably 95% by mass or more.

Examples of the other charge generation materials include known charge generation materials, for example, an azo pigment such as a bisazo pigment and a trisazo pigment; a fused ring aromatic pigment such as dibromoanthanthrone; a perylene pigment; a pyrrolopyrrole pigment; a phthalocyanine pigment other than the titanyl phthalocyanine; zinc oxide; and trigonal selenium.

The binder resin used for the charge generation layer is selected from a wide range of insulating resins, and the binder resin may be selected from organic photoconductive polymers such as poly-N-vinylcarbazole, polyvinylanthracene, polyvinylpyrene, and polysilane.

Examples of the binder resin include a polyvinyl butyral resin, a polyarylate resin (polycondensate of bisphenols and aromatic divalent carboxylic acid, or the like), a polycarbonate resin, a polyester resin, a phenoxy resin, a vinyl chloride-vinyl acetate copolymer, a polyamide resin, an acrylic resin, a polyacrylamide resin, a polyvinylpyridine resin, a cellulose resin, a urethane resin, an epoxy resin, casein, a polyvinyl alcohol resin, and a polyvinylpyrrolidone resin. Here, the term "insulating" means that a volume resistivity is $10^{13}\Omega\cdot cm$ or more.

The binder resins may be used alone or in a form of a mixture of two or more kinds thereof.

A blending ratio between the charge generation material and the binder resin is, for example, preferably in a range of 10:1 to 1:10 in terms of mass ratio.

The charge generation layer may also contain other known additives.

The formation of the charge generation layer is not particularly limited, and a known forming method is used. For example, a coating film of a coating solution for forming the charge generation layer, in which the above-described components are added to a solvent, is formed, and the coating film is dried and then heated as necessary. The charge generation layer may be formed by a vapor deposition of the charge generation material. For example, the formation of the charge generation layer by the vapor deposition is particularly preferable in a case where the fused ring aromatic pigment or the perylene pigment is used as the charge generation material.

Examples of the solvent for preparing the coating solution for forming the charge generation layer include methanol, ethanol, n-propanol, n-butanol, benzyl alcohol, methyl cellosolve, ethyl cellosolve, acetone, methyl ethyl ketone, cyclohexanone, methyl acetate, n-butyl acetate, dioxane, tetrahydrofuran, methylene chloride, chloroform, chlorobenzene, and toluene. The solvents are used alone or in a form of a mixture of two or more kinds thereof.

As a method of dispersing particles (for example, the charge generation material) in the coating solution for forming the charge generation layer, for example, a media disperser such as a ball mill, a vibration ball mill, an attritor, a sand mill, and a horizontal sand mill, or a medialess disperser such as a stirrer, an ultrasonic disperser, a roll mill, and a high-pressure homogenizer is used. Examples of the high-pressure homogenizer include a collision type high-pressure homogenizer in which a dispersion liquid is dispersed by a liquid-liquid collision or a liquid-wall collision in a high-pressure state, and a penetration type high-pressure homogenizer in which a dispersion liquid is dispersed by causing the dispersion liquid to penetrate through a micro-flow path in a high-pressure state.

During the dispersion, it is effective to set an average particle diameter of the charge generation material in the coating solution for forming the charge generation layer to 0.5 μm or less, for example, preferably 0.3 μm or less and more preferably 0.15 μm or less.

Examples of the method of coating the undercoat layer with the coating solution for forming a charge generation layer include typical coating methods such as a blade coating method, a wire bar coating method, a spray coating method, a dip coating method, a bead coating method, an air knife coating method, and a curtain coating method.

A film thickness of the charge generation layer is set to, for example, preferably in a range of 0.1 μm or more and 5.0 μm or less and more preferably in a range of 0.2 μm or more and 2.0 μm or less.

Charge Transport Layer

A charge transport layer is, for example, a layer containing a charge transport material and a binder resin. The charge transport layer may be a layer containing a polymer charge transport material.

Examples of the charge transport material include a quinone-based compound such as p-benzoquinone, chloranil, bromanil, and anthraquinone; a tetracyanoquinodimethane-based compound; a fluorenone compound such as 2,4,7-trinitrofluorenone; a xanthone-based compound; a benzophenone-based compound; a cyanovinyl-based compound; and an electron-transporting compound such as an ethylene-based compound. Examples of the charge transport material also include a positive hole-transporting compound such as a triarylamine-based compound, a benzidine-based compound, an arylalkane-based compound, an aryl-substituted ethylene-based compound, a stilbene-based compound, an anthracene-based compound, and a hydrazone-based compound. The charge transport materials may be used alone or in combination of two or more kinds thereof, but are not limited thereto.

From the viewpoint of charge mobility, for example, a triarylamine derivative represented by Structural Formula (a-1) or a benzidine derivative represented by Structural Formula (a-2) is preferable as the charge transport material.

(a-1)

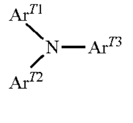

In Structural Formula (a-1), $Ar^{T1}$, $Ar^{T2}$, and $Ar^{T3}$ each independently represent a substituted or unsubstituted aryl group, $-C_6H_4-C(R^{T4})=C(R^{T5})(R^{T6})$, or $-C_6H_4-CH=CH-CH=C(R^{T7})(R^{T8})$. $R^{T4}$, $R^{T5}$, $R^{T6}$, $R^{T7}$, and $R^{T8}$ each independently represent a hydrogen atom, a substituted or unsubstituted alkyl group, or a substituted or unsubstituted aryl group.

Examples of the substituent of each group described above include a halogen atom, an alkyl group having 1 or more and 5 or less carbon atoms, and an alkoxy group having 1 or more and 5 or less carbon atoms. In addition, examples of the substituent of each group described above also include a substituted amino group substituted with an alkyl group having 1 or more and 3 or less carbon atoms.

(a-2)

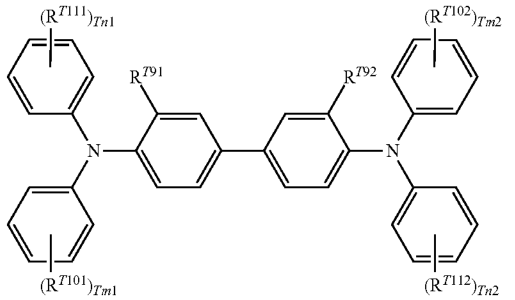

In Structural Formula (a-2), $R^{T91}$ and $R^{T92}$ each independently represent a hydrogen atom, a halogen atom, an alkyl group having 1 or more and 5 or less carbon atoms, or an alkoxy group having 1 or more and 5 or less carbon atoms. $R^{T101}$, $R^{T102}$, $R^{T111}$, and $R^{T112}$ each independently represent a halogen atom, an alkyl group having 1 or more and 5 or less carbon atoms, an alkoxy group having 1 or more and 5 or less carbon atoms, an amino group substituted with an alkyl group having 1 or more and 2 or less carbon atoms, a substituted or unsubstituted aryl group, $-C(R^{T12})=C(R^{T13})(R^{T14})$, or $-CH=CH-CH=C(R^{T15})(R^{T16})$, in which $R^{T12}$, $R^{T13}$, $R^{T14}$, $R^{T15}$, and $R^{T16}$ each independently represent a hydrogen atom, a substituted or unsubstituted alkyl group, or a substituted or unsubstituted aryl group. Tm1, Tm2, Tn1, and Tn2 each independently represent an integer of 0 or more and 2 or less.

Examples of the substituent of each group described above include a halogen atom, an alkyl group having 1 or more and 5 or less carbon atoms, and an alkoxy group having 1 or more and 5 or less carbon atoms. In addition, examples of the substituent of each group described above also include a substituted amino group substituted with an alkyl group having 1 or more and 3 or less carbon atoms.

Here, among the triarylamine derivative represented by Structural Formula (a-1) and the benzidine derivative represented by Structural Formula (a-2), for example, a triarylamine derivative having "$-C_6H_4-CH=CH-CH=C(R^{T7})(R^{T8})$" or a benzidine derivative having "$-CH=CH-CH=C(R^{T15})(R^{T16})$" is particularly preferable from the viewpoint of the charge mobility.

As the polymer charge transport material, known materials having charge transport properties, such as poly-N-vinylcarbazole and polysilane, are used. In particular, for example, a polyester-based polymer charge transport material is particularly preferable. The polymer charge transport material may be used alone or in combination of the binder resin.

Examples of the binder resin used for the charge transport layer include a polycarbonate resin, a polyester resin, a polyarylate resin, a methacrylic resin, an acrylic resin, a polyvinyl chloride resin, a polyvinylidene chloride resin, a polystyrene resin, a polyvinyl acetate resin, a styrene-butadiene copolymer, a vinylidene chloride-acrylonitrile copolymer, a vinyl chloride-vinyl acetate copolymer, a vinyl chloride-vinyl acetate-maleic anhydride copolymer, a silicone resin, a silicone alkyd resin, a phenol-formaldehyde resin, a styrene-alkyd resin, poly-N-vinylcarbazole, and polysilane. Among the above, for example, a polycarbonate resin or a polyarylate resin is preferable as the binder resin. The binder resins may be used alone or in combination of two or more kinds thereof.

A blending ratio between the charge transport material and the binder resin is, for example, preferably 10:1 to 1:5 in terms of mass ratio.

The charge transport layer may also contain other known additives.

The formation of the charge transport layer is not particularly limited, and a known forming method is used. For example, a coating film of a coating solution for forming the charge transport layer, in which the above-described components are added to a solvent, is formed, and the coating film is dried and then heated as necessary.

Examples of the solvent for preparing the coating solution for forming the charge transport layer include typical organic solvents, for example, aromatic hydrocarbons such as benzene, toluene, xylene, and chlorobenzene; ketones such as acetone and 2-butanone; halogenated aliphatic hydrocarbons such as methylene chloride, chloroform, and ethylene chloride; and cyclic or linear ethers such as tetrahydrofuran and ethyl ether. The solvents are used alone or in a form of a mixture of two or more kinds thereof.

Examples of the coating method of coating the charge generation layer with the coating solution for forming the charge transport layer include typical methods such as a blade coating method, a wire bar coating method, a spray coating method, a dip coating method, a bead coating method, an air knife coating method, and a curtain coating method.

A film thickness of the charge transport layer is set to, for example, preferably in a range of 5 μm or more and 50 μm or less and more preferably in a range of 10 μm or more and 30 μm or less.

Protective Layer

A protective layer is provided on the photosensitive layer as necessary. The protective layer is provided, for example, for the purpose of preventing a chemical change in the photosensitive layer during charging and further improving a mechanical strength of the photosensitive layer.

Therefore, for example, a layer formed of a cured film (crosslinked film) may be applied to the protective layer. Examples of the layer include layers described in the items 1) and 2) below.

1) A layer formed of a cured film with a composition containing a reactive group-containing charge transport material that has a reactive group and a charge-transporting skeleton in the same molecule (that is, a layer containing a polymer or a crosslinked body of the reactive group-containing charge transport material)

2) A layer formed of a cured film with a composition containing a non-reactive charge transport material and a reactive group-containing non-charge transport material that has a reactive group and does not have a charge-transporting skeleton (that is, a layer containing the non-reactive charge transport material, and a polymer or a crosslinked body of the reactive group-containing non-charge transport material)

Examples of the reactive group of the reactive group-containing charge transport material include known reactive groups such as a chain polymerizable group, an epoxy group, —OH, —OR [here, R represents an alkyl group], —$NH_2$, —SH, —COOH, and —$SiR^{Q1}{}_{3-Qn}(OR^{Q2})_{Qn}$ [here, $R^{Q1}$ represents a hydrogen atom, an alkyl group, or a substituted or unsubstituted aryl group, $R^{Q2}$ represents a hydrogen atom, an alkyl group, or a trialkylsilyl group, and Qn represents an integer of 1 to 3].

The chain polymerizable group is not particularly limited as long as the group is a functional group capable of radical polymerization, and is, for example, a functional group having a group containing at least carbon double bond. Specific examples thereof include a vinyl group, a vinyl ether group, a vinyl thioether group, a styryl group (vinylphenyl group), an acryloyl group, a methacryloyl group, and a group containing at least one selected from derivatives thereof. Among the above, from the viewpoint that reactivity is excellent, for example, a vinyl group, a styryl group (vinylphenyl group), an acryloyl group, a methacryloyl group, or a group containing at least one selected from derivatives thereof is preferable as the chain polymerizable group.

The charge-transporting skeleton of the reactive group-containing charge transport material is not particularly limited as long as the skeleton is a known structure in the electrophotographic photoreceptor, and examples thereof include a structure conjugated with a nitrogen atom, which is a skeleton derived from a nitrogen-containing positive hole-transporting compound such as a triarylamine-based compound, a benzidine-based compound, and a hydrazone-based compound. Among the above, for example, a triarylamine skeleton is preferable.

The reactive group-containing charge transport material having the reactive group and the charge-transporting skeleton, the non-reactive charge transport material, and the reactive group-containing non-charge transport material may be selected from known materials.

The protective layer may also contain other known additives.

The formation of the protective layer is not particularly limited, and a known forming method is used. For example, a coating film of a coating solution for forming the protective layer, in which the above-described components are added to a solvent, is formed, and the coating film is dried and then subjected to a curing treatment such as heating as necessary.

Examples of the solvent for preparing the coating solution for forming the protective layer include an aromatic solvent such as toluene and xylene; a ketone-based solvent such as methyl ethyl ketone, methyl isobutyl ketone, and cyclohexanone; an ester-based solvent such as ethyl acetate and butyl acetate; an ether-based solvent such as tetrahydrofuran and dioxane; a cellosolve-based solvent such as ethylene glycol monomethyl ether; and an alcohol-based solvent such as isopropyl alcohol and butanol. The solvents are used alone or in a form of a mixture of two or more kinds thereof.

The coating solution for forming the protective layer may be a solvent-less coating solution.

Examples of the method of coating the photosensitive layer (for example, the charge transport layer) with the coating solution for forming the protective layer include typical methods such as a dip coating method, a push-up coating method, a wire bar coating method, a spray coating method, a blade coating method, an air knife coating method, and a curtain coating method.

A film thickness of the protective layer is set to, for example, preferably in a range of 1 μm or more and 20 μm or less and more preferably in a range of 2 μm or more and 10 μm or less.

Image Forming Apparatus (and Process Cartridge)

The image forming apparatus according to the present exemplary embodiment includes the electrophotographic photoreceptor, a charging device that charges a surface of the electrophotographic photoreceptor, an electrostatic latent image forming device that forms an electrostatic latent image on the charged surface of the electrophotographic photoreceptor, a developing device that develops the electrostatic latent image formed on the surface of the electrophotographic photoreceptor with a developer containing a toner to form a toner image, and a transfer device that transfers the toner image to a surface of a recording medium. The above-described electrophotographic photoreceptor according to the present exemplary embodiment is adopted as the electrophotographic photoreceptor.

As the image forming apparatus according to the present exemplary embodiment, a known image forming apparatus such as an apparatus including a fixing device that fixes the toner image transferred to the surface of a recording medium; a direct transfer-type apparatus that transfers the toner image formed on the surface of the electrophotographic photoreceptor directly to the recording medium; an intermediate transfer-type apparatus that primarily transfers the toner image formed on the surface of the electrophotographic photoreceptor to a surface of an intermediate transfer member and secondarily transfers the toner image transferred to the surface of the intermediate transfer member to the surface of the recording medium; an apparatus including a cleaning device that cleans the surface of the electrophotographic photoreceptor after the transfer of the toner image and before the charging; an apparatus including a charge erasing device that erases the charges on the surface of the electrophotographic photoreceptor by applying the charge erasing light after the transfer of the toner image and before the charging; or an apparatus including an electrophotographic photoreceptor heating member for increasing the temperature of the electrophotographic photoreceptor and decreasing the relative temperature is adopted.

In a case of the intermediate transfer-type apparatus, the transfer device has a configuration including an intermediate transfer member with surface on which the toner image will be transferred, a primary transfer device that performs primary transfer to transfer the toner image formed on the surface of the electrophotographic photoreceptor to the surface of the intermediate transfer member, and a secondary transfer device that performs secondary transfer to transfer the toner image transferred to the surface of the intermediate transfer member to the surface of a recording medium.

The image forming apparatus according to the present exemplary embodiment may be any of a dry development-type image forming apparatus or a wet development-type (development type using a liquid developer) image forming apparatus.

In the image forming apparatus according to the present exemplary embodiment, for example, a portion including the electrophotographic photoreceptor may have a cartridge structure (process cartridge) that is attachable to and detachable from the image forming apparatus. As the process cartridge, for example, a process cartridge including the electrophotographic photoreceptor according to the present exemplary embodiment is preferably used. The process cartridge may include, for example, at least one selected from the group consisting of a charging device, an electrostatic latent image forming device, a developing device, and a transfer device, in addition to the electrophotographic photoreceptor.

An example of the image forming apparatus according to the present exemplary embodiment will be shown below, but the present invention is not limited thereto. Hereinafter, among the parts shown in the drawing, main parts will be described, and others will not be described.

Figure 2:
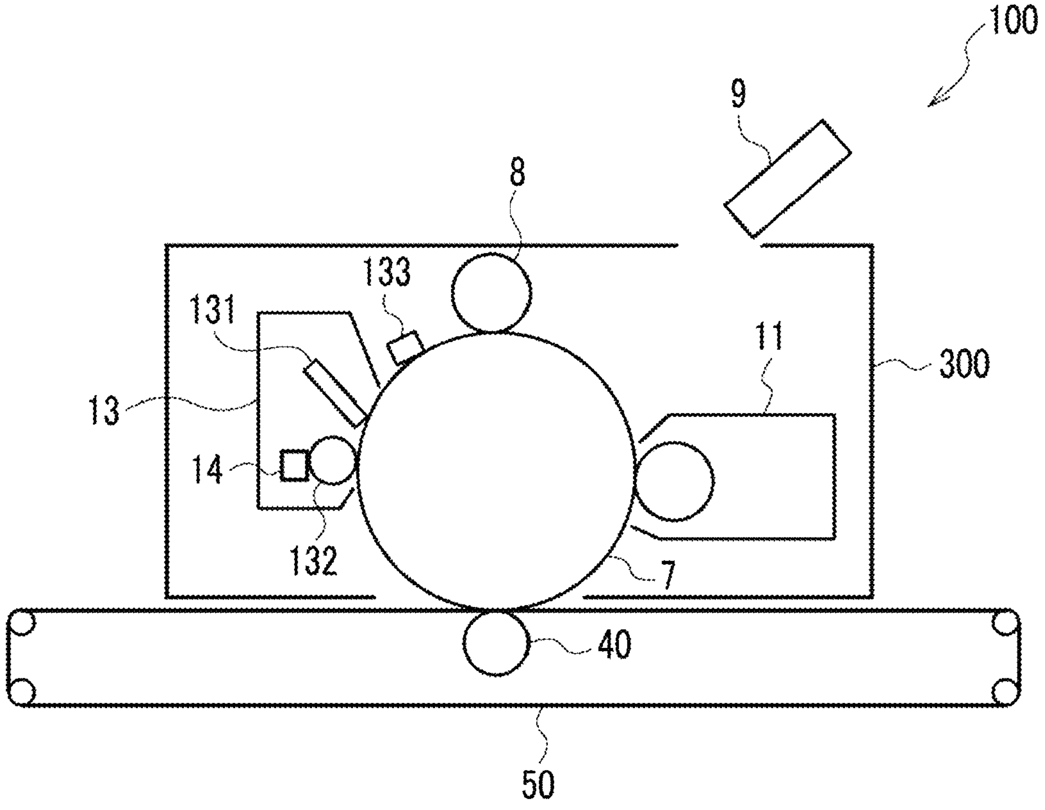
FIG. 2 is a view schematically showing the configuration of an example of an image forming apparatus according to the present exemplary embodiment.

FIG. 2 is a view schematically showing a configuration of an example of the image forming apparatus according to the present exemplary embodiment.

As shown in FIG. 2, an image forming apparatus 100 according to the present exemplary embodiment includes a process cartridge 300 including an electrophotographic photoreceptor 7, an exposure device 9 (an example of the electrostatic latent image forming device), a transfer device 40 (primary transfer device), and an intermediate transfer member 50. In the image forming apparatus 100, the exposure device 9 is disposed at a position that can be exposed to the electrophotographic photoreceptor 7 from an opening portion of the process cartridge 300; the transfer device 40 is disposed at a position that faces the electrophotographic photoreceptor 7 through the intermediate transfer member 50; and the intermediate transfer member 50 is disposed such that a part of the intermediate transfer member 50 is in contact with the electrophotographic photoreceptor 7. Although not shown, the image forming apparatus also includes a secondary transfer device that transfers the toner image transferred to the intermediate transfer member 50 to a recording medium (for example, paper). The intermediate transfer member 50, the transfer device 40 (primary transfer device), and the secondary transfer device (not shown) correspond to an example of the transfer device.

The process cartridge 300 in FIG. 2 integrally supports the electrophotographic photoreceptor 7, a charging device 8 (an example of the charging device), a developing device 11 (an example of the developing device), and a cleaning device 13 (an example of the cleaning device) in a housing. The cleaning device 13 has a cleaning blade (an example of a cleaning member) 131, and the cleaning blade 131 is disposed to come into contact with the surface of the electrophotographic photoreceptor 7. The cleaning member may be a conductive or insulating fibrous member instead of the aspect of the cleaning blade 131, and may be used alone or in combination with the cleaning blade 131.

FIG. 2 shows an example of an image forming apparatus including a fibrous member 132 (roll shape) that supplies a lubricant 14 to the surface of the electrophotographic photoreceptor 7 and a fibrous member 133 (flat brush shape) that assists the cleaning, but these are disposed as necessary.

Hereinafter, each configuration of the image forming apparatus according to the present exemplary embodiment will be described.

Charging Device

As the charging device 8, for example, a contact-type charger formed of a conductive or semi-conductive charging roller, a charging brush, a charging film, a charging rubber blade, a charging tube, or the like is used. In addition, a known charger such as a non-contact type roller charger, and a scorotoron charger or a corotron charger using corona discharge is also used.

Exposure Device

Examples of the exposure device 9 include an optical system device that exposes the surface of the electrophotographic photoreceptor 7 to light such as a semiconductor laser beam, LED light, and liquid crystal shutter light in a predetermined image pattern. A wavelength of the light source is within the spectral sensitivity region of the electrophotographic photoreceptor. As a wavelength of a semiconductor laser, near infrared laser, which has an oscillation wavelength in the vicinity of 780 nm, is mostly used. However, the wavelength is not limited thereto, and a laser having an oscillation wavelength of an approximately 600 nm level or a laser having an oscillation wavelength of 400 nm or more and 450 nm or less as a blue laser may also be used. In addition, a surface emission-type laser light source capable of outputting a multi-beam is also effective for forming a color image.

Developing Device

Examples of the developing device 11 include a typical developing device that performs development in contact or non-contact with the developer. The developing device 11 is not particularly limited as long as the device has the above-described functions, and is selected depending on the purpose thereof. Examples thereof include known developing machines having a function of attaching a one-component developer or a two-component developer to the electrophotographic photoreceptor 7 using a brush, a roller, or the like. Among the above, for example, a developing roller in which a developer is retained on a surface is preferably used.

The developer used in the developing device 11 may be a one-component developer containing only a toner or a two-component developer containing a toner and a carrier. In addition, the developer may be magnetic or non-magnetic. Known developers are employed as the developer.

Cleaning Device

As the cleaning device 13, a cleaning blade-type device including the cleaning blade 131 is used.

In addition to the cleaning blade-type device, a fur brush cleaning-type device or a simultaneous development cleaning-type device may be adopted.

Transfer Device

Examples of the transfer device 40 include a known transfer charger such as a contact type transfer charger using a belt, a roller, a film, a rubber blade, or the like, and a scorotron transfer charger or a corotron transfer charger using corona discharge.

Intermediate Transfer Member

As the intermediate transfer member 50, a semi-conductive belt-like intermediate transfer member (intermediate transfer belt) containing polyimide, polyamide-imide, polycarbonate, polyarylate, polyester, rubber, or the like is used. In addition, as the form of the intermediate transfer member, a drum-like intermediate transfer member may be used in addition to the belt-like intermediate transfer member.

Figure 3:
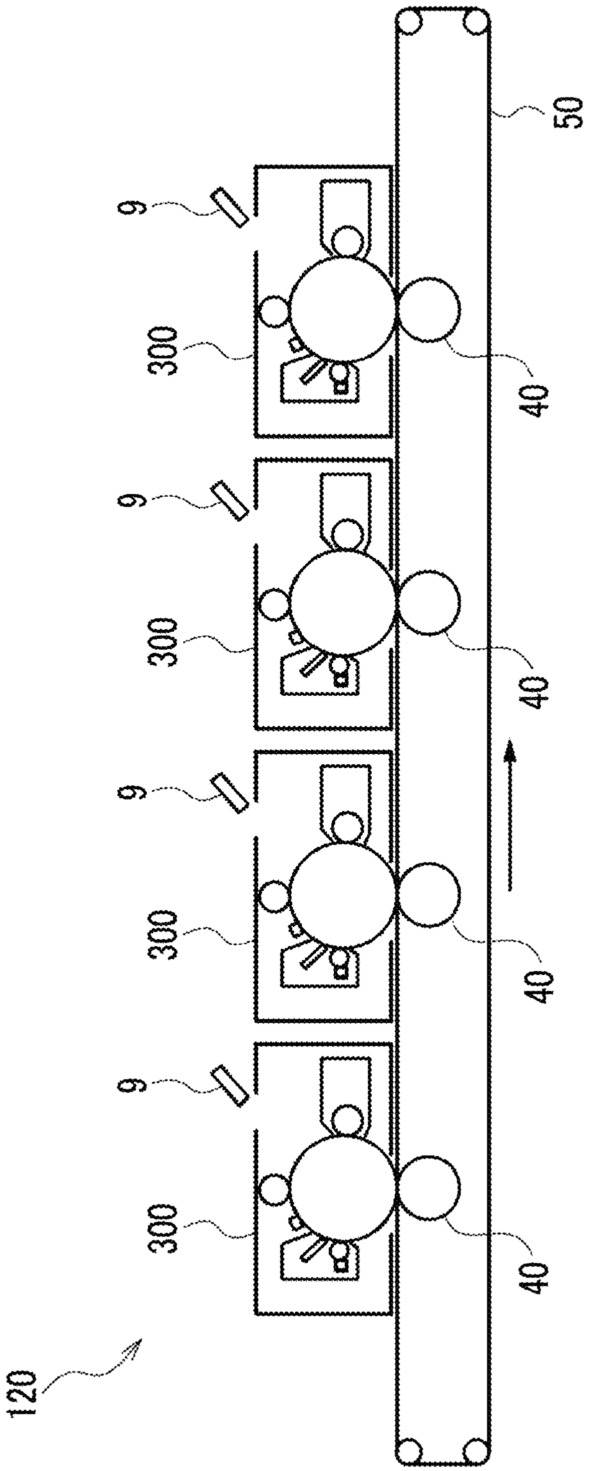
FIG. 3 is a view schematically showing a configuration of another example of the image forming apparatus according to the present exemplary embodiment.

FIG. 3 is a view schematically showing a configuration of another example of the image forming apparatus according to the present exemplary embodiment.

An image forming apparatus 120 shown in FIG. 3 is a tandem type multicolor image forming apparatus in which four process cartridges 300 are mounted. The image forming apparatus 120 is formed such that the four process cartridges 300 are arranged in parallel on the intermediate transfer member 50, and one electrophotographic photoreceptor is used for each color. The image forming apparatus 120 has the same configuration as the image forming apparatus 100, except that the image forming apparatus 120 is of a tandem type.

EXAMPLES

Hereinafter, the present invention will be described in more detail with reference to Examples and Comparative Examples, but the present invention is not limited to such examples.

Example 1

Production of Electrophotographic Photoreceptor 100 parts by mass of zinc oxide particles (product name: Nano Tek ZnO, manufactured by C.I. Kasei CO., LTD.) are heated in a stainless steel beaker at 120° C. for 2 hours to perform preliminarily drying.

Next, the preliminarily dried zinc oxide particles are stirred, and 40 parts by mass of a 4% by mass toluene solution of N-β-(aminoethyl)-γ-aminopropyltrimethoxysilane (silane coupling agent) is sprayed onto the zinc oxide while stirring, and the mixture is stirred at 100° C. for 1 hour. Thereafter, a baking treatment is further performed at 175° C. for 1 hour, and the particles are crushed with a mortar.

Next, 25 parts by mass of the obtained zinc oxide particles surface-treated with the surface treatment agent, 10 parts by mass of a curing agent (blocked isocyanate, SUMIDUR 3175, manufactured by Sumitomo Bayer Urethane Co., Ltd.), 9 parts by mass of a butyral resin S-LEC BM-1 (manufactured by Sekisui Chemical Co., Ltd.), 60 parts by mass of methyl ethyl ketone, and 0.1 parts by mass of an additive (EDHA: 4-ethoxy-1,2-dihydroxy-9,10-anthraquinone) are mixed, and the mixture is dispersed for 2 hours with a sand mill using glass beads of 1 mmφ to obtain a dispersion.

3 parts by mass of silicone balls "TOSPEARL 120 (manufactured by NISSHO SANGYO Co., Ltd.)" and 0.01 parts by mass of silicone oil SH29PA (manufactured by DuPont-Toray Specialty Materials Co., Ltd.) are added to the obtained dispersion. In this manner, a coating solution for forming an undercoat layer is obtained.

The obtained coating solution for forming an undercoat layer is applied onto an aluminum cylindrical conductive substrate, and dried and cured at 160° C. for 60 minutes. As a result, an undercoat layer having a film thickness of 23.5 μm is formed.

Here, the application of the coating solution onto the conductive substrate is carried out by dip coating using a coating solution circulation method. The circulation flow rate of the coating solution in the dip coating is set to 1.5 [L/min].

Next, a mixture consisting of 15 parts by mass of titanyl phthalocyanine having a maximum diffraction peak at a Bragg angle (2θ+) 0.2° of 27.3° in an X-ray diffraction spectrum using CuKα ray, as a titanium-containing organic pigment that is a charge generation material, 10 parts by mass of a polyvinyl butyral resin (S-LEC BM-5, manufactured by Sekisui Chemical Co., Ltd.) as a binder resin, and 300 parts by mass of n-butyl acetate is dispersed for 4 hours with a sand mill using glass beads of 1 mmφ.

As the titanyl phthalocyanine, a hydrated crystal having a molecular formula of $TiPc(H_2O)_n$ (in the formula, Pc represents a phthalocyanine residue and n represents 0.15 to 1) after being dried under reduced pressure at 100° C. and 0.1 mmHg and then left to stand in an air atmosphere at room temperature (25° C.) and normal pressure (1 atm) for 12 hours is used.

The obtained coating solution for forming a charge generation layer is applied onto the undercoat layer by dip coating, and dried. As a result, a charge generation layer having a film thickness of 150 nm is formed.

Next, 4 parts by mass of N,N'-diphenyl-N,N'-bis(3-methylphenyl)-[1,1']biphenyl-4,4'-diamine and 6 parts by mass of a bisphenol Z polycarbonate resin (viscosity-average molecular weight: 40,000) are added to 80 parts by mass of chlorobenzene to be dissolved.

The obtained coating solution for forming a charge transport layer is applied onto the charge generation layer by dip coating, and dried at 130° C. for 40 minutes. As a result, a charge transport layer having a film thickness of 25 μm is formed.

By the above-described operation, a photoreceptor is obtained.

Examples 2 to 24 and Comparative Examples 1 to 14

A photoreceptor is obtained in the same manner as in Example 1, except that the amount of the zinc oxide particles with respect to the binder resin and the amount of the titanium-containing organic pigment with respect to the binder resin are changed as shown in Table 1.

Here, the circulation flow rate of the coating solution in the dip coating is adjusted such that the proportion of the Ti concentration and the proportion of the Zn concentration with respect to the total of the Ti concentration and the Zn concentration in the region within +500 nm in the film thickness direction from the interface between the undercoat layer and the charge generation layer are the values shown in Table 1.

The amount of the zinc oxide particles and the amount of the titanium-containing organic pigment shown in Table 1 are indicated as parts by mass in a case where the amount of the binder resin is 100 parts by mass.

Evaluation

Proportion of Ti Concentration and Proportion of Zn Concentration

The following characteristic of the photoreceptor of each example is measured according to the method described above.

- Proportion of the Ti concentration and the proportion of the Zn concentration with respect to the total of the Ti concentration and the Zn concentration in the region within +500 nm in the film thickness direction from the interface between the undercoat layer and the charge generation layer Actual Device Evaluation The photoreceptor of each example is mounted as a photoreceptor for black on an evaluation image forming apparatus ("DocuPrint CP400 ps II" manufactured by FUJIFILM Business Innovation Corp.).

The following evaluation is performed using the evaluation image forming apparatus.

The evaluation image forming apparatus is an image forming apparatus including a direct current charging device and not including a static current charging device that eliminates static electricity of the photoreceptor before charging the photoreceptor after toner transfer.

Positive Ghost

The positive ghost is evaluated as follows.

Using the above-described image forming apparatus equipped with the photoreceptor of each example, 100 pattern charts having a text "G" and having "black solid region" are continuously output in an environment of 22° C. and 55% RH, and the appearance of the character "G" (ghost) in the black solid region of the 100th image is visually observed and evaluated according to the following standard. The evaluation standard is as follows.

A+ (◎): text "G" is not confirmed in the black solid region.

A (○): text "G" is vaguely confirmed in the black solid region.

B (Δ): text "G" is slightly confirmed in the black solid region (no problem in practical use).

C (x): text "G" is clearly confirmed in the black solid region.

TABLE 1

| | Amount of zinc oxide particles (part by mass) | Amount of titanium-containing organic pigment (part by mass) | Region within ±500 nm in film thickness direction from interface between undercoat layer and charge generation layer: Proportion of Ti concentration (%) | Region within ±500 nm in film thickness direction from interface between undercoat layer and charge generation layer: Proportion of Zn concentration (%) | Film thickness of undercount layer (μm) | Positive ghost |
|---|---|---|---|---|---|---|
| Example 1 | 132 | 150 | 20 | 80 | 15 | A (○) |
| Example 2 | 132 | 150 | 40 | 60 | 15 | A (○) |
| Example 3 | 132 | 150 | 60 | 40 | 15 | A (○) |
| Example 4 | 132 | 150 | 80 | 20 | 15 | A (○) |
| Example 5 | 132 | 150 | 20 | 80 | 20 | B (Δ) |
| Example 6 | 132 | 150 | 30 | 70 | 20 | A (○) |
| Example 7 | 132 | 150 | 70 | 30 | 20 | A (○) |
| Example 8 | 132 | 150 | 80 | 20 | 20 | B (Δ) |
| Example 9 | 132 | 150 | 30 | 70 | 22 | A (○) |
| Example 10 | 132 | 150 | 40 | 60 | 22 | A (○) |
| Example 11 | 132 | 150 | 50 | 50 | 22 | A (○) |
| Example 12 | 132 | 150 | 60 | 40 | 22 | A (○) |
| Example 13 | 132 | 150 | 70 | 30 | 22 | A (○) |
| Example 14 | 132 | 150 | 30 | 70 | 23.5 | B (Δ) |
| Example 15 | 132 | 150 | 40 | 60 | 23.5 | A (○) |
| Example 16 | 132 | 150 | 50 | 50 | 23.5 | A+ (◎) |
| Example 17 | 132 | 150 | 60 | 40 | 23.5 | A (○) |
| Example 18 | 132 | 150 | 70 | 30 | 23.5 | B (Δ) |
| Example 19 | 132 | 150 | 40 | 60 | 30 | B (Δ) |
| Example 20 | 132 | 150 | 50 | 50 | 30 | A (○) |
| Example 21 | 132 | 150 | 60 | 40 | 30 | B (Δ) |
| Example 22 | 150 | 150 | 70 | 30 | 23.5 | A (○) |
| Example 23 | 150 | 170 | 70 | 30 | 23.5 | B (Δ) |
| Example 24 | 100 | 115 | 70 | 30 | 23.5 | B (Δ) |
| Comparative Example 1 | 132 | 150 | 20 | 80 | 14 | C (X) |
| Comparative Example 2 | 132 | 150 | 80 | 20 | 14 | C (X) |
| Comparative Example 3 | 132 | 150 | 10 | 90 | 15 | C (X) |
| Comparative Example 4 | 132 | 150 | 90 | 10 | 15 | C (X) |
| Comparative Example 5 | 132 | 150 | 20 | 80 | 22 | C (X) |
| Comparative Example 6 | 132 | 150 | 80 | 20 | 22 | C (X) |
| Comparative Example 7 | 132 | 150 | 10 | 90 | 23.5 | C (X) |
| Comparative Example 8 | 132 | 150 | 20 | 80 | 23.5 | C (X) |
| Comparative Example 9 | 132 | 150 | 80 | 20 | 23.5 | C (X) |
| Comparative Example 10 | 132 | 150 | 90 | 10 | 23.5 | C (X) |
| Comparative Example 11 | 132 | 150 | 25 | 75 | 30 | C (X) |
| Comparative Example 12 | 132 | 150 | 75 | 25 | 30 | C (X) |
| Comparative Example 13 | 132 | 150 | 40 | 60 | 32 | C (X) |
| Comparative Example 14 | 132 | 150 | 60 | 40 | 32 | C (X) |

From the results of the table, it is found that the photoreceptor of the present example suppresses the positive ghost as compared with the photoreceptor of Comparative Examples.

The present exemplary embodiments include the following aspects.

(((1)))

An electrophotographic photoreceptor comprising:

a conductive substrate;

an undercoat layer that is provided on the conductive substrate and contains zinc oxide particles and a binder resin;

a charge generation layer that is provided on the undercoat layer and contains titanium-containing organic pigment and a binder resin; and a charge transport layer that is provided on the charge generation layer, wherein a film thickness of the undercoat layer is 15.0 μm or more and 30.0 μm or less, in a case where the film thickness of the undercoat layer is 22.0 μm or more and 30.0 μm or less, each of a proportion of a Ti concentration and a proportion of a Zn concentration with respect to a total of the Ti concentration and the Zn concentration in a region within +500 nm in a film thickness direction from an interface between the undercoat layer and the charge generation layer is 30% or more and 70% or less, and in a case where the film thickness of the undercoat layer is 15.0 μm or more and less than 22.0 μm, each of a proportion of a Ti concentration and a proportion of a Zn concentration with respect to a total of the Ti concentration and the Zn concentration in a region within +500 nm in a film thickness direction from an interface between the undercoat layer and the charge generation layer is 20% or more and 80% or less.

(((2)))

The electrophotographic photoreceptor according to (((1))), wherein the titanium-containing organic pigment is titanyl phthalocyanine.

(((3)))

The electrophotographic photoreceptor according to (((1))) or (((2))), wherein the film thickness of the undercoat layer is 15.0 μm or more and 25.0 μm or less, and each of the proportion of the Ti concentration and the proportion of the Zn concentration with respect to the total of the Ti concentration and the Zn concentration in the region within ±500 nm in the film thickness direction from the interface between the undercoat layer and the charge generation layer is 40% or more and 60% or less.

(((4)))

A process cartridge comprising:

the electrophotographic photoreceptor according to any one of (((1))) to (((3))), wherein the process cartridge is attachable to and detachable from an image forming apparatus.

(((5)))

An image forming apparatus comprising:

the electrophotographic photoreceptor according to any one of (((1))) to (((3)));

a charging device that charges a surface of the electrophotographic photoreceptor;

an electrostatic charge image forming device that forms an electrostatic charge image on the charged surface of the electrophotographic photoreceptor;

a developing device that develops the electrostatic charge image formed on the surface of the electrophotographic photoreceptor with a developer containing a toner to form a toner image; and a transfer device that transfers the toner image to a surface of a recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophotographic photoreceptor comprising:

a conductive substrate;

an undercoat layer that is provided on the conductive substrate and contains zinc oxide particles and a binder resin;

a charge generation layer that is provided on the undercoat layer and contains titanium-containing organic pigment and a binder resin; and a charge transport layer that is provided on the charge generation layer, wherein a film thickness of the undercoat layer is 15.0 μm or more and 30.0 μm or less, in a case where the film thickness of the undercoat layer is 22.0 μm or more and 30.0 μm or less, each of a proportion of a Ti concentration and a proportion of a Zn concentration with respect to a total of the Ti concentration and the Zn concentration in a region within ±500 nm in a film thickness direction from an interface between the undercoat layer and the charge generation layer is 30% or more and 70% or less, and in a case where the film thickness of the undercoat layer is 15.0 μm or more and less than 22.0 μm, each of a proportion of a Ti concentration and a proportion of a Zn concentration with respect to a total of the Ti concentration and the Zn concentration in a region within ±500 nm in a film thickness direction from an interface between the undercoat layer and the charge generation layer is 20% or more and 80% or less.

2. The electrophotographic photoreceptor according to claim 1, wherein the titanium-containing organic pigment is titanyl phthalocyanine.

3. A process cartridge comprising:

the electrophotographic photoreceptor according to claim 2, wherein the process cartridge is attachable to and detachable from an image forming apparatus.

4. An image forming apparatus comprising:

the electrophotographic photoreceptor according to claim 2;

a charging device that charges a surface of the electrophotographic photoreceptor;

an electrostatic charge image forming device that forms an electrostatic charge image on the charged surface of the electrophotographic photoreceptor;

a developing device that develops the electrostatic charge image formed on the surface of the electrophotographic photoreceptor with a developer containing a toner to form a toner image; and a transfer device that transfers the toner image to a surface of a recording medium.

5. The electrophotographic photoreceptor according to claim 1, wherein the film thickness of the undercoat layer is 15.0 μm or more and 25.0 μm or less, and each of the proportion of the Ti concentration and the proportion of the Zn concentration with respect to the total of the Ti concentration and the Zn concentration in the region within ±500 nm in the film thickness direction from the interface between the undercoat layer and the charge generation layer is 40% or more and 60% or less.

6. A process cartridge comprising:

the electrophotographic photoreceptor according to claim 5, wherein the process cartridge is attachable to and detachable from an image forming apparatus.

7. An image forming apparatus comprising:

the electrophotographic photoreceptor according to claim 5;

a charging device that charges a surface of the electrophotographic photoreceptor;

an electrostatic charge image forming device that forms an electrostatic charge image on the charged surface of the electrophotographic photoreceptor;

a developing device that develops the electrostatic charge image formed on the surface of the electrophotographic photoreceptor with a developer containing a toner to form a toner image; and a transfer device that transfers the toner image to a surface of a recording medium.

8. A process cartridge comprising:

the electrophotographic photoreceptor according to claim 1, wherein the process cartridge is attachable to and detachable from an image forming apparatus.

9. An image forming apparatus comprising:

the electrophotographic photoreceptor according to claim 1;

a charging device that charges a surface of the electrophotographic photoreceptor;

an electrostatic charge image forming device that forms an electrostatic charge image on the charged surface of the electrophotographic photoreceptor;

a developing device that develops the electrostatic charge image formed on the surface of the electrophotographic photoreceptor with a developer containing a toner to form a toner image; and a transfer device that transfers the toner image to a surface of a recording medium.

* * * * *